Figure 1:
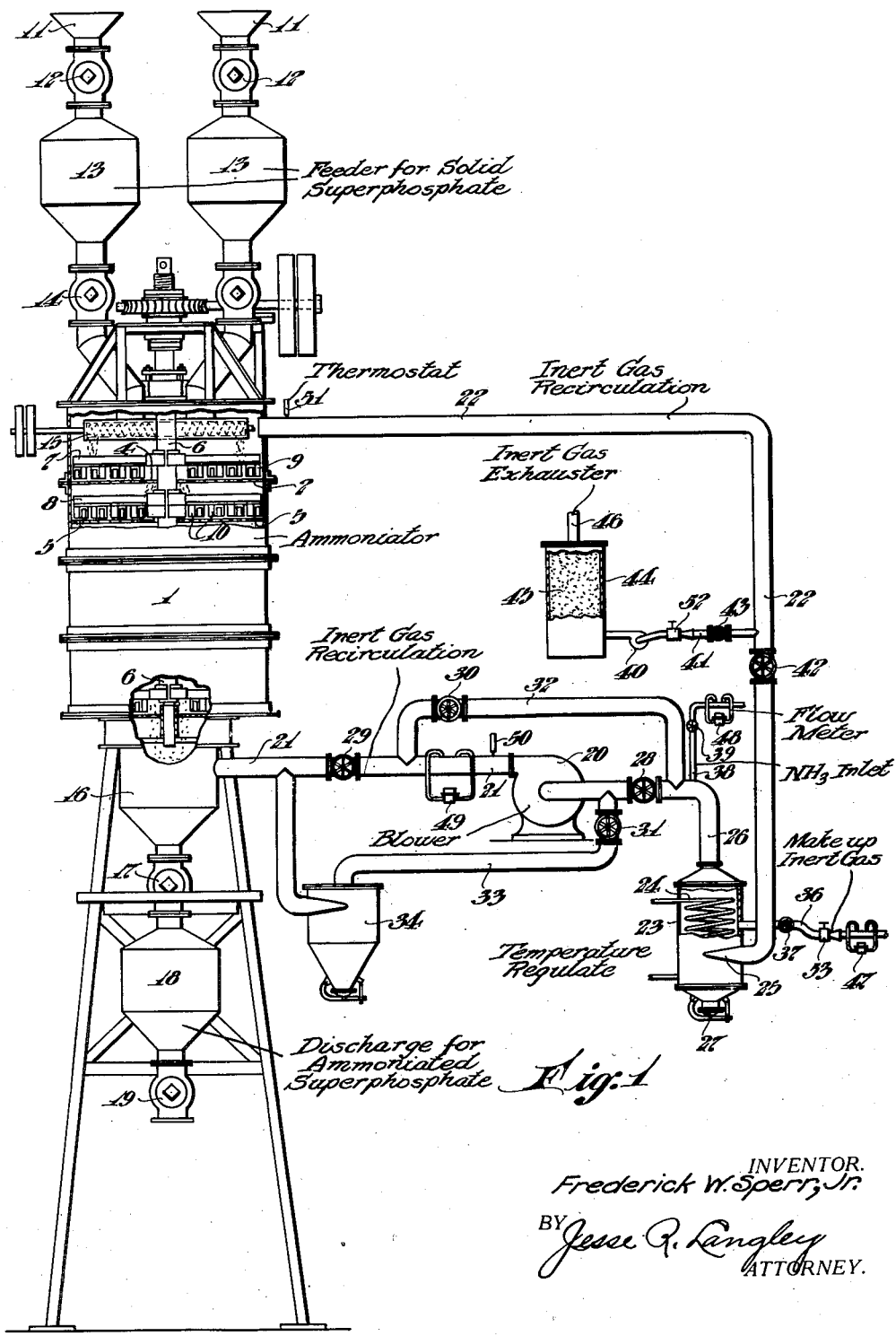

July 31, 1934.   F. W. SPERR, JR   1,968,323
PROCESS OF MANUFACTURING FERTILIZERS
Filed Jan. 14, 1931   2 Sheets-Sheet 1

INVENTOR.
Frederick W. Sperr, Jr.
BY Jesse R. Langley
ATTORNEY.

Patented July 31, 1934

1,968,323

UNITED STATES PATENT OFFICE 1,968,323

PROCESS OF MANUFACTURING FERTILIZERS

Frederick W. Sperr, Jr., Pittsburgh, Pa., assignor to The Koppers Company of Delaware, a corporation of Delaware Application January 14, 1931, Serial No. 508,620

2 Claims. (Cl. 71—9)

This invention relates to improvements in apparatus for and processes of manufacturing fertilizers and more particularly to apparatus for and processes of ammoniating phosphate materials.

An object of the present invention is to provide apparatus for and a process of efficiently ammoniating phosphatic material to produce a product commercially suitable for fertilizing purposes.

A further object is to provide means for contacting phosphatic material with gases containing ammonia and means for controlling conditions under which ammoniation takes place.

A still further object is to provide a process in which superphosphate material is treated with ammonia-containing gases to produce a product having a relatively high ammonia content and yet one which has a relatively low percentage of so-called reverted matter.

It is well known that one of the products of reaction between ammonia and calcium monophosphate, which is the principal phosphoric acid compound in superphosphate, is the insoluble tricalcium phosphate, which is considered by the majority of agrictultural authorities to be unavailable or only very slowly available as a plant food. At any rate, whatever may be its real value, this form of phosphate material, insoluble in ammonium citrate solution, is not considered to have any commercial value according to the present official method of fertilizer analysis (set forth in the latest edition of "Official and Tentative Methods of Analysis" prepared by the American Association of Official Agricultural Chemists), and its production, therefore, represents a direct monetary loss of valuable phosphoric acid.

In recent years, developments in the ammoniation of superphosphate have been almost altogether directed toward the utilization of highly concentrated ammonia such as that which is obtained from the manufacture of synthetic ammonia. In such developments there has been great difficulty in avoiding high reversion losses if any considerable percentage of ammonia is introduced, and up to the present time, such developments have not gone beyond the point of using the ammonia as a so-called conditioning agent to the extent of one or two percent of the superphosphate, other materials such as ammonium sulphate being still required to supply the bulk of the nitrogen.

In the process of the present invention, ammonia is diluted with non-reactive gases or with gases containing compounds, such as carbon dioxide, which are beneficial to the reaction which takes place between the ammonia and the superphosphate. The gases are employed in a circulatory system and repeated contact with the superphosphate material is brought about. The present process is therefore particularly adapted to the use of gas containing relatively low percentages of ammonia. The diluted form of ammonia is of advantage for any continuous process of ammoniation. So far, the use of highly concentrated ammonia has been successful only in batch or intermittent treatment.

In the present invention the proportions of ammonia gas to the diluting gas are controlled and additions of ammonia may be made in such a way that these proportions are kept substantially constant throughout the circulating system. The temperature of the circulating gases employed is easily controlled by suitable heating or cooling means. The non-reacting gases in themselves serve as a valuable medium for carrying away the heat of reaction, thus reducing reversion losses.

The maintenance of a uniform moisture condition in the superphosphate is important. Excessive moisture tends to increase reversion losses. By the proper control of temperature, the moisture present in the superphosphate or the moisture liberated during ammoniation is removed by means of the non-reacting gases. With a diluted form of ammonia, even distribution thereof in contact with the superphosphate is facilitated and local irregularities of reaction are avoided.

The presence of carbon dioxide in the gas is of importance because it facilitates absorption of part of the ammonia by the gypsum present in the superphosphate according to the following reaction:

$$CaSO_4.2H_2O + 2NH_3 + CO_2 = CaCO_3 + (NH_4)_2SO_4 + H_2O$$

Thus the amount of ammonia entering into reactions that may favor reversion of the $P_2O_5$ is correspondingly reduced.

A very satisfactory diluent for the ammonia is stack gas by which term is meant the waste products of combustion of carbonaceous fuels. Such gas may contain from 8% to about 20% of carbon dioxide depending upon the fuel used and the efficiency of combustion. Other diluents such as air or nitrogen may be employed. In some cases, fuel gas such as coal gas from gas retorts or from coke ovens, or gases from gas producers, or from the distillation of shale, may be used. Such fuel gases may contain a very desirable proportion of ammonia, namely, substantially 200 to 500 grains per 100 cu. ft.

Various superphosphate material, including good den superphosphates and others may be employed in the present process and apparatus. A preferred form and one from which very satisfactory results are obtained is a superphosphate prepared and employed as set forth in my copending application, Serial No. 505,091, filed December 27, 1930.

Ordinary acid phosphate as made by the open-pile or den system and pulverized for commercial use, is characterized by being composed of fine particles with a high percentage of dusty material, particularly when dry. The dust is of a peculiarly adherent form so that any machinery exposed to it will become coated with layers of this dust which constantly increase in thickness and require expensive cleaning from time to time. This dust is also the cause of rapid deterioration of any machinery and apparatus on which it accumulates.

The difficulties of using such material are obvious. Not only is the interior of the gas contact apparatus liable to accumulations of dust with consequent stoppages, but a considerable proportion of the superphosphate is apt to be blown out by the gas, requiring expensive means for the subsequent removal of such material. In order to avoid excessive loss of material in this way, very low gas velocities have to be employed, thus reducing the capacity of the apparatus.

If the superphosphate contains enough moisture to materially reduce the evolution of dust, other disadvantages present themselves. The moist material is strongly liable to cake or set or produce a lumpy condition, so that it cannot be efficiently ammoniated. Furthermore, the presence of moisture over possibly 6 or 7% increases the tendency to reversion.

I have found that by the proper control of conditions in ammonia-containing gases, a superphosphate prepared in the maner set forth below and having the characteristics to be described, may be effectively employed for ammoniation purposes and at the same time a very desirable fertilizer may be produced.

The superphosphate material which is particularly adapted to the present process is prepared, for example by charging an autoclave with predetermined quantities of finely ground phosphate rock and an acid such as sulphuric acid. The proportions of materials used may be in the neighborhood of 85 parts by weight of 52° Baumé acid and 100 parts by weight of ground phosphate rock.

These materials are mixed during the conversion of the phosphate rock into calcium acid phosphate, either by rotation of the autoclave or by any suitable mixing means. The contents of the autoclave are agitated and, if desired, heat applied for a necessary period which is generally about one-half hour. During this period the materials may react under pressure of evolved gases, which may be regulated to any desired condition.

At the end of the reaction period vacuum is applied while still rotating the autoclave and the heating may be continued for a sufficient time to substantially complete the reactions and produce material of the requisite moisture content. The rotation of the autoclave is then stopped and the superphosphate discharged in the form of uniformly porous balls or nodules varying in size from very small pellets up to nodules of several inches in diameter. This material is of a higher density, has greater hardness and greater compressive and tensile strength than ordinary den superphosphate, which latter is generally clayey and crumbles readily into a dust. The material from the autoclave is free-flowing and does not readily set.

Although it is desirable for subsequent utilization to crush the larger globoid particles to a uniform size, nevertheless, in the final product a substantial proportion is still in the characteristic porous ball form. The peculiar formation of the particles is apparently due to the manner in which the material is rotated in the autoclave. By this rotation the individual nodules become encrustated which partly accounts for the free-flowing nature of the product from the autoclave.

The moisture content of the autoclaved material can be readily and exactly regulated to a uniformly optimum amount which is approximately 6%. Furthermore, this material is readily permeable to the penetration and flow of the gas.

The superphosphate material prepared in the manner described may be crushed so that substantially all of the material will pass through a six mesh screen. With reasonable care in the crushing operation, the material will contain less than 5% of particles which pass through a hundred mesh screen. This material is treated with an ammonia-containing gas in a manner which is now to be described.

Figure 2:
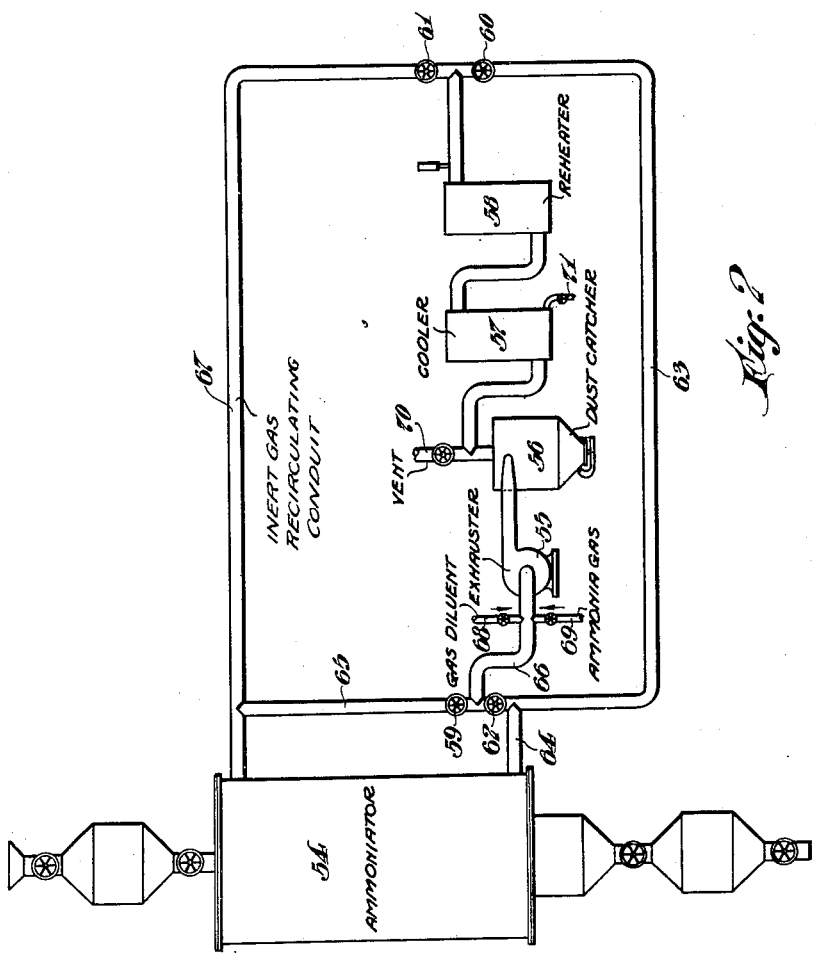

In the accompanying drawings forming a part of this specification and showing for purposes of exemplification a preferred form and manner in which the invention may be embodied and practiced but without limiting the claimed invention specifically to such illustrative instance or instances, Figure 1 shows an elevational view partially in cross section, of apparatus employed in connection with the present process in a preferred arrangement; and Figure 2 is a diagrammatic view of a modified form of apparatus.

The apparatus shown comprises a chamber in which superphosphate material is contacted with ammonia-containing gases, means for repeatedly circulating such gases in and out of the chamber, means for charging the chamber with superphosphate material and means for discharging ammoniated superphosphate from the said chamber.

The ammoniating chamber may be of any desired type such as revolving cylinders or towers of various kinds. The apparatus shown provides the advantages inherent to the use of a continuous type of absorber for countercurrently or concurrently contacting a recirculating gas.

For the ammoniation apparatus it has been found advantageous to employ equipment designed and operated on the principle of the mechanical sulphide ore roasting furnaces employed in metallurgical operations. The present adaptation and application of this type of equipment appear to be novel.

The ammoniator 1 comprises preferably a cylindrical chamber having therein a series of evenly spaced superposed horizontal trays. Two types of trays are used, as, for instance, 2 and 3, arranged alternately, trays 2 having openings 4 in the center, and trays 3 having openings 5 adjacent to the wall of the ammoniator 1. A shaft 6 is mounted vertically in the center of the ammoniator for rotating the rabble arms 7 and 8 which are designed to push material on the trays either toward the center or toward the sides of the ammoniating chamber.

For instance, the rabble arms 7 mounted above the trays 2 are designed so that upon rotation of the shaft, the blades 9 push the superphosphate material toward the opening 4, whereupon the material drops to the trays 3, and the rabble arms 8 above trays 3 have blades 10 for pushing the material toward the openings 5.

Charging apparatus, operated in a manner to be described, and mounted on the top of the ammoniator 1, comprises a hopper 11, a valve 12, a chamber 13, and a valve 14 for admitting superphosphate to a screw conveyor 15 situated within the ammoniator above the top tray.

For discharging material from the ammoniator, a hopper 16 is provided beneath the lowest tray. A valve 17 is provided for admitting the material from the hopper 16 into a chamber 18 and a valve 19 is provided beneath the chamber 18.

For the purpose of recirculating gases through the ammoniator 1, means are provided for passing the gas either countercurrently or concurrently with the superphosphate material. Countercurrent operation is usually preferred.

The construction and operation of a circulating system will be described by way of example. For countercurrent operation a blower 20 forces the gas to be recirculated through a pipe 21 into the bottom of the ammoniator 1. The gases are withdrawn from the top of the ammoniator through a pipe 22 and are passed back to the blower 20. Before passing the gases back into the ammoniator, the temperature of the gases may be adjusted by passing them through a temperature regulating device 23 provided with a coil 24 through which a heating or a cooling medium may be passed.

The device 23 may be constructed similar to a dust catcher. In other words, the gases may be admitted tangentially as at 25 and the gases free from dust may be passed out at the top of the means 23 through a pipe 26. A valve 27 is provided for removing the collected dust particles.

During countercurrent operation, the valves 28 and 29 are kept open while the valves 30 and 31 in the bypasses 32 and 33, respectively, are closed. For concurrent operation, the valves 28 and 29 are closed while the valves 30 and 31 are open. To reverse the flow from countercurrent operation to concurrent operation, valves 30 and 31 are opened, then valve 29 is closed and then valve 28 is closed. A dust catcher 34 may be provided in bypass 33.

To reverse the flow from concurrent to countercurrent operation, valves 28 and 29 are opened and then valves 30 and 31 are closed. It is thus seen that a change in the direction of gas is readily made without changing the direction in which the blower 20 is operated.

The gaseous diluent, such as stack gas for instance, may be admitted at any point in the cycle. Preferably, it may be admitted into the regulating means 23 by means of a pipe 36 and by opening the valve 37. The ammonia gas may be admitted at any point as for instance through a pipe 38 into the pipe 26 by opening the valve 39.

Gases may be withdrawn from any point by means of an exhauster 40 in a pipe 41 connected to the pipe 22. A pressure differential may be maintained by partially closing a valve 42 in the pipe 22 and opening a valve 43 in the pipe 41. The exhausted gas is passed through a catch box 44 which may be filled with superphosphate material 45 for removing ammonia from the gas before it passes out through a pipe 46.

Various control means may be employed for properly adjusting the proportions of the gases and the flow thereof as well as the temperature. For this purpose, a flow meter 47 may be provided for determining the quantity of stack gas admitted and a flow meter 48 may be provided for determining the quantity of ammonia. A flow meter 49 indicates the rate of flow of the gaseous mixture. Thermometers may be placed at various points in the path of the gas as, for instance, at 50 and 51.

In order to maintain a constant pressure in the system, either above or below atmospheric pressure, automatic gas pressure regulators 52 and 53 may be placed in the pipes 41 and 36 respectively.

In the operation of the ammoniator, superphosphate material is admitted into the chamber 13 of a charging means by opening the valve 12, the valve 14 being kept closed. The valve 12 is then closed and before opening the valve 14 it has been found desirable to exhaust the chamber 13 of gases. When the valve 14 is open, the superphosphate material drops into the screw conveyor 15 from which it is distributed on the outer portions of the top tray 2. Two charging devices for forwarding material into the ammoniating chamber may be provided as shown so that one may be filled while the other one is being emptied.

If desired, other materials may be mixed with the superphosphate before passing it into the ammoniator. In certain instances, it has been found advantageous to mix the superphosphate material with ammonium sulphate.

Material in the ammoniator is zigzagged downwardly therethrough while the layers of material on the trays are maintained in continuous agitation. Gases are passed through the ammoniator either concurrently or countercurrently with the superphosphate material.

At the end of the desired ammoniation period, the ammoniated product is immediately passed out of contact with the gases through the valve 17 into the chamber 18, valve 19 being closed. When the chamber 18 is full, the valve 17 is closed and the valve 19 is opened. Before opening the valve 19, the gases may be withdrawn from the chamber 18.

As the regulation of the temperature in the ammoniator is very important, the various pipes in the circulating system as well as the temperature regulator 23 and the ammoniator 1, should be effectively insulated. All precautions should be taken to prevent condensation of moisture except in a cooler when one is employed.

It is preferable to adjust the regulator 23 so that the gas will enter the ammoniator at the temperature of about 40° C. The temperature of the gas in the ammoniator should not be permitted to go below substantially 30° C. nor above substantially 50° C.

The regulating device 23 may be replaced by any other type of apparatus for adjusting the temperature of the gas. In some instances, a heating or cooling unit may be omitted or its size may be changed. With the omission of a cooling unit, for example, if the gases leaving the ammoniator, are excessively warm, the temperature thereof may be adjusted by exhausting some of the warm gases and admitting an equivalent quantity of fresh cool gas into the circulating system.

In Fig. 2 an arrangement is shown whereby the gases coming from an ammoniating chamber 54, similar in construction to that shown in Fig. 1, are cooled to condense moisture and then reheated to the desired temperature before passing them back into the ammoniating chamber.

The gases are withdrawn from the ammoniating chamber by means of an exhauster 55 and forced successively through a dust catcher 56, a cooler 57 and a reheater 58. The dust catcher my be omitted if desired.

By means of suitable piping, the gas from the reheater 58 is passed into the ammoniating chamber 54 either countercurrently or concurrently with respect to the superphosphate. For countercurrent operation valves 59 and 60 are open and valves 61 and 62 are closed. The gas passes to the bottom of the chamber 54 through pipes 63 and 64 and is withdrawn from the top, passing to the blower 55 through pipes 65 and 66.

For concurrent operation valves 61 and 62 are open and valves 59 and 60 are closed. The gas passes to the top of the chamber through a pipe 67 and is withdrawn from the bottom, passing to the blower 55 through pipes 64 and 66.

The gaseous diluent is admitted into the system through a pipe 68 and the ammonia is admitted through a pipe 69. Gases may be withdrawn through a pipe 70. Various control means may be used such as flow meters in pipes 68 and 69 and after the blower, and automatic pressure regulators may be placed in pipes 68 and 70. A thermometer may be placed in the pipe after the reheater.

Means 71 is provided for drawing off condensed moisture from the cooler 57. Means may also be provided for washing out solid accumulations.

By means of the apparatus shown, it is possible to operate under any desired degree of pressure either above or below atmospheric. Very satisfactory results may be obtained by operating under sub-atmospheric conditions in which case leakage of ammonia is prevented and if there is any leakage it will result in the admission of air into the system which will not be harmful.

The percentage of ammonia in the ammoniated product should not ordinarily exceed 5% and the usual figure is 4%. The percentage of insoluble $P_2O_5$ in the ammoniated product depends upon that present in the original superphosphate but the increase in the ammoniation operation should not exceed substantially 1.5%.

For example a desirable amount of ammonia in the gas entering the ammoniator is about 300 grains $NH_3$ per 100 cu. ft. of gas, and the rate of feed of superphosphate to the ammoniator should be regulated in proportion to the rate of flow of gas or vice versa, so that the outgoing ammoniated superphosphate will have the desired constant percent of $NH_3$. Ammonia gas should be continuously added to replace what is consumed.

The velocity of the gas in the circulating system may be regulated so that the gas may be recirculated any desired number of times in the interval between the entry of the superphosphate into the ammoniator and the removal of the ammoniated material therefrom. The velocity of the gas may also be such that the concentration of the ammonia in the gas passing through the ammoniator remains substantially constant.

Under certain circumstances, the ammoniator may be so constructed that the superphosphate may be passed through within a very short interval of time so that with gases containing high proportions of ammonia, the contact period may be shortened and the ammoniated superphosphate removed before the ammonia content exceeds 4 or 5% and before excessive reversion takes place. In the apparatus shown, for instance, the time of contact of the gas with the superphosphate may be shortened or lengthened to some extend by decreasing or increasing respectively, the number of trays in the ammoniator.

It may be readily seen that the operation of the ammoniator shown and described is such that the ammoniated product is withdrawn from the action of the ammonia gas as soon as this product has attained the desired percentage of ammonia. This is one of the conditions essential to preventing high reversion.

In the operation of the gas circulation system some improvement may be obtained by periodically reversing the direction of flow of the gas. Some improvement may also be obtained by regulating the rate of flow of the gaseous mixture, and the proportions of ammonia to diluent so that under a given temperature and pressure, the ammonia content of the gas leaving the ammoniator is only slightly below that entering the ammoniator.

When stack gas is used as a diluent, soot and dust may be removed before admitting the gas into the circulatory system. Fuel gas, such as coal gas, may be first treated to remove tar, and other materials, in the manner set forth in my copending application Serial No. 505,090, filed December 27, 1930 (Case 449).

Ammonia gas which is introduced into the apparatus for recirculation, may be derived from any source. Aqua ammonia or ammonia liquor may be heated or gases may be blown through solutions of ammonia and the ammonia generated passed into the circulatory system.

The invention as hereinbefore set forth is embodied in a particular form but may be variously embodied within the scope of the claims hereinafter made.

I claim as my invention:

1. A process of preparing a fertilizer, which comprises the steps of continuously recirculating in closed cycle the same non-aqueous ammonia-diluting inert gaseous-carrier for gaseous ammonia repeatedly into and out of contact with solid superphosphate material; the inert gaseous-carrier being charged with a relatively low percentage of ammonia for said contact and thereby ammoniating the superphosphate material with diluted ammonia; adjusting with concentrated ammonia the concentration of ammonia in the recirculating non-aqueous carrier-gas issuing from said contact while the carrier-gas is out of said contact and before it is recirculated back into contact in its cyclic flow to make up for the ammonia abstracted from the inert carrier and to bring the inert carrier back to a predetermined constant value of a relatively low percentage of ammonia; and passing ammoniated superphosphate out of contact with the recirculating inert non-aqueous gaseous carrier.

2. A process of preparing a fertilizer, which comprises the steps of continuously recirculating in closed cycle, over the surface of but not through the material of successive layers of solid superphosphate while maintaining continuous agitation of said layers, the same non-aqueous ammonia-diluting inert gaseous-carrier for gaseous ammonia repeatedly into and out of surface contact with the solid superphosphate material; the inert gaseous carrier being charged with a relatively low percentage of ammonia for said contact and thereby ammoniating the superphosphate material with diluted ammonia; adjusting with concentrated ammonia the concentration of ammonia in the recirculating non-aqueous carrier-gas issuing from said contact while the carrier gas is out of said contact and before it is recirculated back into contact in its cyclic flow to make up for the ammonia abstracted from the inert carrier and to bring the inert carrier back to a predetermined constant value of a relatively low percentage of ammonia; and passing ammoniated superphosphate out of contact with the recirculating inert non-aqueous gaseous carrier.

FREDERICK W. SPERR, Jr.